United States Patent
Mandel et al.

(10) Patent No.: US 9,605,744 B2
(45) Date of Patent: Mar. 28, 2017

(54) DAMPENING ASSEMBLY AND RELATED METHOD OF MAKING SAME

(71) Applicant: GKN SINTER METALS, LLC, Auburn Hills, MI (US)

(72) Inventors: Joel H. Mandel, Hartford, WI (US); Donald D. Cooper, Fond Du Lac, WI (US); John P. Mohr, Ripon, WI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 0 days.

(21) Appl. No.: 14/396,158

(22) PCT Filed: Apr. 23, 2013

(86) PCT No.: PCT/US2013/037761
§ 371 (c)(1),
(2) Date: Oct. 22, 2014

(87) PCT Pub. No.: WO2013/163156
PCT Pub. Date: Oct. 31, 2013

(65) Prior Publication Data
US 2015/0141182 A1 May 21, 2015

Related U.S. Application Data

(60) Provisional application No. 61/637,438, filed on Apr. 24, 2012.

(51) Int. Cl.
*F16D 3/00* (2006.01)
*F16H 55/14* (2006.01)
(Continued)

(52) U.S. Cl.
CPC ............... *F16H 55/36* (2013.01); *B22F 3/12* (2013.01); *B22F 7/08* (2013.01); *F16F 15/126* (2013.01);
(Continued)

(58) Field of Classification Search
CPC .. F16H 2055/366; F16H 55/36; F16F 15/126; F16F 15/1442; Y10T 74/2131
(Continued)

(56) References Cited

U.S. PATENT DOCUMENTS 288,134 A * 11/1883 Stone, Jr. ............... F16H 55/14
464/75
2,307,129 A 1/1943 Hines et al.
(Continued)

FOREIGN PATENT DOCUMENTS

CN 2375821 Y 4/2000
CN 202073974 U 12/2011
(Continued)

OTHER PUBLICATIONS

International Search Report and Written Opinion under date of mailing of Jul. 4, 2013 in connection with PCT/US2013/037761.
(Continued)

*Primary Examiner* — Henry Liu
(74) *Attorney, Agent, or Firm* — Quarles & Brady LLP

(57) ABSTRACT

An assembly comprising: a powder metal outer part (22) having a radially inward facing cylindrical surface (54) with a plurality of facets (52) formed thereon that, in an alternating fashion, extend in an axial direction from an axial side of the powder metal outer part toward an opposite axial side of the powder metal outer part to a position between the opposing axial sides of the powder metal outer part; a powder metal inner part (20) having a radially outward facing cylindrical surface with a plurality of facets formed thereon that, in an alternating fashion, extend in an axial direction from an axial side of the powder metal inner part toward an opposite axial side of the powder metal inner part to a position between the opposing axial sides of the powder metal inner part; and an intermediate component (26) dis-
(Continued)

posed between the cylindrical surfaces of the powder metal outer part and the powder metal inner part that connects the powder metal outer part and the powder metal inner part together.

20 Claims, 8 Drawing Sheets

(51) Int. Cl.
    *F16H 55/36* (2006.01)
    *F16F 15/14* (2006.01)
    *B22F 3/12* (2006.01)
    *B22F 7/08* (2006.01)
    *F16F 15/126* (2006.01)

(52) U.S. Cl.
    CPC .... *F16F 15/1442* (2013.01); *F16H 2055/366* (2013.01)

(58) Field of Classification Search
    USPC .......................................................... 474/94
    See application file for complete search history.

(56) References Cited

U.S. PATENT DOCUMENTS

| | | | | |
|---|---|---|---|---|
| 2,539,630 A | | 1/1946 | Krueger et al. | |
| 3,101,214 A | * | 8/1963 | Chisholm | B60B 17/00 105/198.7 |
| 3,216,267 A | * | 11/1965 | Dolza | F16D 3/50 464/79 |
| 3,257,860 A | * | 6/1966 | Runde | B62D 55/0963 464/75 |
| 3,524,359 A | * | 8/1970 | Buchwald | F01L 1/024 474/110 |
| 3,901,101 A | * | 8/1975 | McGavern | F16F 15/1442 188/268 |
| 4,010,972 A | * | 3/1977 | Schindehutte | B60B 17/0034 295/11 |
| 4,674,351 A | | 6/1987 | Byrd | |
| 4,815,332 A | * | 3/1989 | Serizawa | F16F 15/126 368/171 |
| 4,881,426 A | * | 11/1989 | Serizawa | F16F 15/126 474/166 |
| 5,025,681 A | * | 6/1991 | Andra | F16F 15/1442 74/574.4 |
| 5,139,120 A | * | 8/1992 | Gomi | F16F 15/136 188/378 |
| 5,231,893 A | * | 8/1993 | Sisco | F16F 15/126 74/574.4 |
| 5,445,049 A | * | 8/1995 | Ullrich | F16F 15/126 267/141.3 |
| 5,452,622 A | | 9/1995 | Fenelon | |
| 5,460,356 A | * | 10/1995 | Schwibinger | F16F 15/1203 267/281 |
| 5,540,626 A | * | 7/1996 | Asai | F16F 15/124 474/178 |
| 5,544,550 A | * | 8/1996 | Smith | B22F 3/1055 175/336 |
| 5,695,176 A | * | 12/1997 | Colford | F16F 15/1442 267/154 |
| 6,026,709 A | * | 2/2000 | Depp | F16F 15/126 464/180 |
| 6,065,943 A | * | 5/2000 | Suito | F04B 27/0895 417/362 |
| 6,106,421 A | * | 8/2000 | Graber | F16F 15/126 474/94 |
| 6,171,194 B1 | * | 1/2001 | Haga | F16D 3/52 464/89 |
| 6,283,076 B1 | * | 9/2001 | Simpson | F16H 7/06 123/192.1 |
| 6,386,065 B1 | * | 5/2002 | Hodjat | F16F 15/126 474/94 |
| 6,648,055 B1 | * | 11/2003 | Haug | B22D 19/14 164/113 |
| 6,875,113 B2 | * | 4/2005 | Nichols | F16F 15/1442 464/90 |
| 7,047,644 B2 | * | 5/2006 | Hodjat | F16F 15/126 29/892 |
| 7,244,185 B2 | | 7/2007 | Kamdem et al. | |
| 7,258,154 B2 | * | 8/2007 | Yamaguchi | B22D 17/24 164/112 |
| 7,410,035 B2 | * | 8/2008 | Crissy | F16D 65/0006 188/218 A |
| 7,429,502 B2 | * | 9/2008 | Archer, III | H01L 21/4871 257/719 |
| 7,975,750 B2 | * | 7/2011 | Dessouki | F16D 65/0018 164/100 |
| 7,993,228 B2 | * | 8/2011 | Nosaka | F16D 3/68 474/161 |
| 8,070,632 B2 | * | 12/2011 | Yuan | F16D 3/74 464/89 |
| 8,714,232 B2 | * | 5/2014 | Hanna | B22C 21/14 164/112 |
| 8,758,902 B2 | * | 6/2014 | Hanna | B22D 19/00 164/75 |
| 2003/0038001 A1 | * | 2/2003 | Yamaguchi | B22D 17/24 188/218 XL |
| 2003/0060289 A1 | | 3/2003 | Nichols | |
| 2003/0186749 A1 | | 10/2003 | Hauck | |
| 2004/0166974 A1 | * | 8/2004 | Hodjat | F16F 15/126 474/94 |
| 2006/0052185 A1 | * | 3/2006 | Kawaguchi | A63B 53/0466 473/349 |
| 2006/0076200 A1 | * | 4/2006 | Dessouki | F16D 65/0018 188/218 XL |
| 2006/0084541 A1 | * | 4/2006 | Nosaka | F16D 3/68 474/170 |
| 2006/0085968 A1 | * | 4/2006 | Yamaguchi | B22D 17/24 29/527.5 |
| 2008/0280709 A1 | | 11/2008 | Gouadec | |
| 2008/0298996 A1 | | 12/2008 | Kuplen et al. | |
| 2010/0263787 A1 | * | 10/2010 | Kawaguchi | A63B 53/0466 156/221 |
| 2012/0094791 A1 | * | 4/2012 | Lee | F16F 15/126 474/94 |
| 2012/0135830 A1 | * | 5/2012 | Burke | B62M 9/02 474/94 |
| 2012/0231909 A1 | * | 9/2012 | Shin | F16F 15/126 474/94 |
| 2012/0252599 A1 | * | 10/2012 | Kawaguchi | A63B 53/0466 473/332 |
| 2013/0337952 A1 | * | 12/2013 | Berruet | F16H 55/36 474/94 |

FOREIGN PATENT DOCUMENTS

| | | |
|---|---|---|
| DE | 41 11 233 A1 | 10/1992 |
| EP | 1 382 871 A1 | 1/2001 |
| GB | 245847 | 1/1926 |
| JP | S63 170631 U | 11/1988 |
| WO | 88/04377 A1 | 6/1988 |
| WO | 2011/011569 A1 | 1/2011 |

OTHER PUBLICATIONS

The State Intellectual Property Office of the People's Republic of China, Notice on the First Office Action, Aug. 21, 2015, 23 pages including English translation.
The State Intellectual Property Office of the People's Republic of China, Second Office Action and Search Report, Application No. 201380021458.9, Apr. 13, 2016, 22 pages.
The State Intellectual Property Office of the People's Republic of China, Third Office Action, Application No. 201380021458.9, Oct. 18, 2016, 10 pages.

* cited by examiner

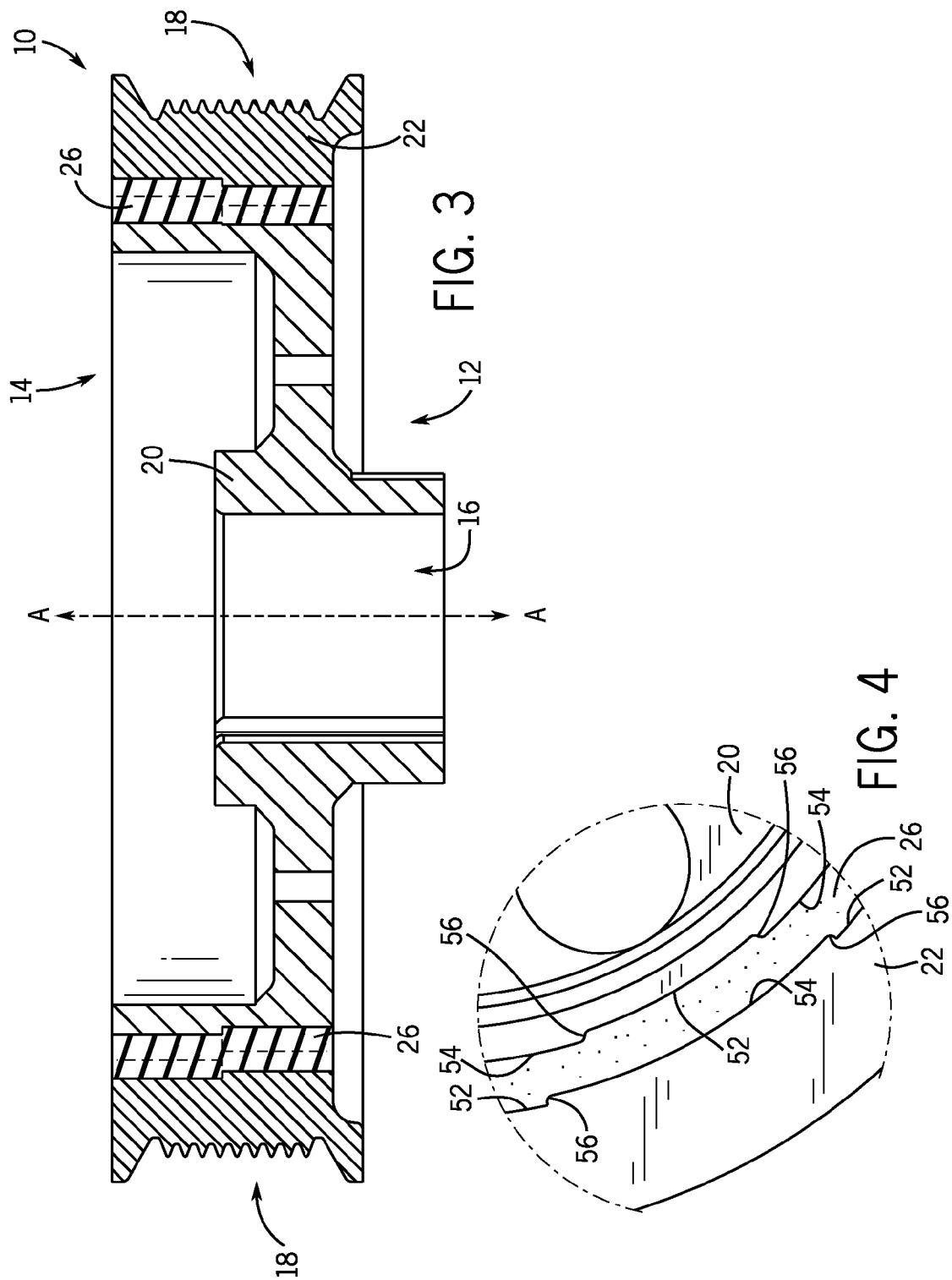

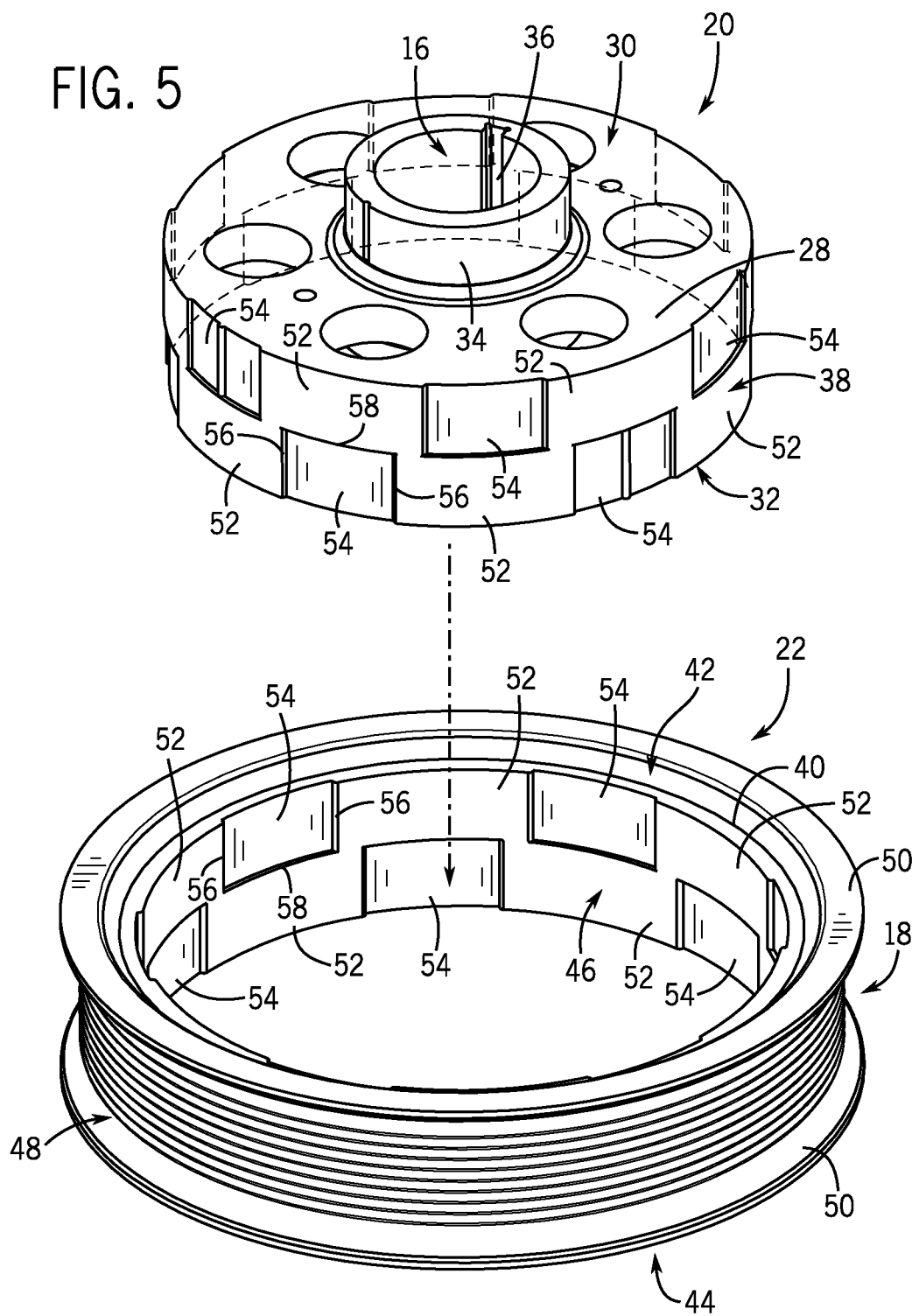

DAMPENING ASSEMBLY AND RELATED METHOD OF MAKING SAME

CROSS-REFERENCE TO RELATED APPLICATIONS

This application represents the national stage entry of PCT International Application No. PCT/US2013/037761 filed Apr. 23, 2013 and claims the benefit of the filing date of U.S. Provisional Patent Application No. 61/637,438 filed Apr. 24, 2012, both of which are hereby incorporated herein by reference for all purposes.

STATEMENT OF FEDERALLY SPONSORED RESEARCH OR DEVELOPMENT

Not applicable.

BACKGROUND

This disclosure relates to assemblies for dampening rotary motion such as, for example, damper pulleys for use with automotive internal combustion engines.

In order to reduce the effect of torsional vibration during power transmission in automobiles, pulley mechanisms have been developed with internal dampeners. These dampeners help to dissipate spikes in the transmitted energy and to absorb vibrations that occur during rotary motion of the pulley mechanism.

Dampening pulleys are conventionally made from two cast iron parts which are bonded together with rubber. Usually, an inner hub and an outer ring are first cast. Then, one or both of the parts may be machined. Typically during machining, a raised annular lip is formed in the outer diameter of the hub and an annular recess is formed in the inner diameter of the ring, although these features could be reversed. Then, to assemble the pulley, the hub is placed inside the ring such that faces having the machined annular lip and recess oppose one another and rubber is molded or placed between the cast metal parts to bond the two metal parts together and to establish a dampening element in between the two metal parts.

However, machining operations such as those used to form the annular lip and recess can be expensive and time consuming. Moreover, the bond between the cast metal parts and the rubber can limit the quality and ability of the assembly to perform its dampening function. Hence, there is a continued need for improvements in assemblies for dampening rotary vibrations created during power transmission and for improved methods of making such assemblies.

SUMMARY OF THE INVENTION

This disclosure provides an improved assembly for dampening rotary vibrations created during power transmission. The assembly can include powder metal components having unique and improved locking features in the form of alternating facets that would be difficult and even uneconomical to machine into cast components. The implementation of alternating facets permits for improved bonding of the intermediate elastomeric material to the hub and ring.

According to one aspect of the invention, an assembly includes a powder metal outer part (for example, a ring), a powder metal inner part (for example, a hub), and an intermediate component. The powder metal outer part has a radially inward facing cylindrical surface and the powder metal inner part has a radially outward facing cylindrical surface. A plurality of facets are formed on each of the radially inward facing cylindrical surface and the radially outward facing cylindrical surface. These facets, in an alternating fashion, extend in an axial direction from one of the opposing axial sides of the part to a position between the opposing axial sides. The intermediate component is disposed or formed between the powder metal outer part and the powder metal inner part and connects the powder metal outer part and the powder metal inner part together.

In some embodiments, the assembly may be a damper pulley for use with an automotive internal combustion engine. The damper pulley may be used to reduce vibrational noise.

In some forms of the assembly, the intermediate component may be an elastomeric material such as, for example, rubber. This elastomeric material may be inserted between the powder metal parts and vulcanized or otherwise cured to bond to the surfaces of the parts.

In some forms of the assembly, the intermediate component may include a radially inward facing surface that bonds to the radially outward facing surface of the powder metal inner part and the intermediate element may further include a radially outward facing surface that bonds to the radially inward facing surface of the powder metal outer part. Accordingly, the intermediate component may have a surface profile on the radially inward facing surface that generally inversely corresponds with the surface profile of the radially outward facing surface of the powder metal inner part and may have a surface profile on the radially outward facing surface that generally inversely corresponds with the surface profile of the radially inward facing surface of the powder metal outer part. Because powder metal components can have some amount of micro-porosity on their surfaces into which the material of the intermediate component may be received, it should be appreciated that the surfaces may not perfectly match or correspond with one another.

Once the intermediate component is disposed or formed between the powder metal inner part and the powder metal outer part to connect them together, the facets can be used to inhibit the movement of the intermediate component in both an axial direction and in an angular direction relative to the orientations of the powder metal inner part and the powder metal outer part.

The facets could be defined as recesses or could be defined as plateaus. In either case, the facets may be radially offset cylindrical surfaces from the corresponding cylindrical surface on which the facets are formed. In some arrangements, the facets may form a grid and adjacent facets can overlap with one another. The plurality of facets on the radially inward facing surface of the powder metal outer part and the radially outward facing surface of the powder metal inner part may form a checkered pattern.

In some forms, the facets may be arranged into annular rows and the powder metal inner part and the powder metal outer part may each have two annular rows of the facets.

Each facet may include at least one side surface that extends inward from one of the opposing axial sides of the part and at least one end surface that is inwardly offset from one of the opposing axial sides and that is generally perpendicular to the at least one side surface. The side surface(s) may extend generally perpendicularly from one of the opposing axial sides of the part. In one form, there may be two side surfaces at opposing ends of the end surface. These side surfaces can be formed such that they extend along a radial plane relative to the part. The end surface may lie in a plane perpendicular to the axis of the part.

The powder metal outer part may have a radially outward facing surface with a track formed therein for reception of a belt. This track may be machined into the radially outward facing surface of the powder metal outer part.

According to another aspect, a method of making an assembly of the type described above is disclosed. A first preform and a second preform are compacted from powder metal and sintered to form a powder metal inner part and a powder metal outer part of the type described above with alternating facets formed on cylindrical faces of the parts. The powder metal outer part and the powder metal inner part are connected or bonded together using an intermediate component.

The step of connecting the powder metal outer part and the powder metal inner part together using an intermediate component may include (1) placing or positioning the powder metal inner part inside the powder metal outer part such that the powder metal inner part and the powder metal outer part are co-axial with one another and have an inter-part volume there between and (2) forming the intermediate component in the inter-part volume. In some embodiments, this may be performed by introducing an elastomeric material (for example, rubber) into the inter-part volume via injection or the like and subsequently vulcanized or cured. The intermediate component may fill at least a portion of the facets on the powder metal inner part and the powder metal outer part and, in some forms, may even infiltrate some of the pores on the surface of the powder metal parts.

In some forms of the method, a belt guide may be machined into a radially outward facing cylindrical surface of the powder metal outer part.

Accordingly, this disclosure provides a new and improved manner of bonding a hub to a ring, both of which have alternating facets. These facets can be formed during the compaction of powder metal to form the precursor powder metal preforms (also known as powder metal compacts) and can ultimately be used as locking features (after sintering of the preforms) during rubber bonding. These locking features can inhibit motion of the hub and ring both angularly and axially relative to one another. Because these facets can be formed during compaction of the powder metal preforms, they can be formed without extensive machining after formation of the hub and/or ring.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE DRAWINGS

FIG. 3 is a side cross sectional view taken through the line 3-3 of FIG. 2;

FIG. 4 is a detailed view taken along line 4-4 of FIG. 2;

FIG. 5 is an exploded perspective view of the powder metal parts of the assembly, before the formation of the intermediate dampening component therebetween, in which the inner part (hub) is shown being inserted into the outer part (ring);

DETAILED DESCRIPTION

Looking first at FIGS. 1 through 4, an assembly 10 is shown. This assembly 10 is a damper pulley for dampening rotary vibrations and noise created during power transmission. An assembly 10 of this type could be used, for example, to transmit and smooth the power generated by an internal combustion engine in an automobile.

As with most pulleys, the assembly 10 is generally disc-shaped. The body of the assembly 10 has a central axis A-A of rotation and extends between opposing axial sides 12 and 14. In the particular form shown, a central opening 16 is formed along axis A-A in the center of the assembly 10. This central opening 16 is adapted to receive a shaft (such as, for example, an end of a crankshaft, not shown) and, by implementation of keyways, splines, or other rotary power transmitting features between the shaft and the central opening 16, can be made to transmit power therebetween. On the outer circumference of the assembly 10, there is a belt track 18 that is shaped to receive a belt.

Before further describing the overall structure and function of the assembly 10, a general description of the constituent components that form the assembly 10 will now be provided. This description of the constituent components will aid in an understanding of how the various components of the assembly 10 relate to one another, both in structure and in function.

Figure 6:
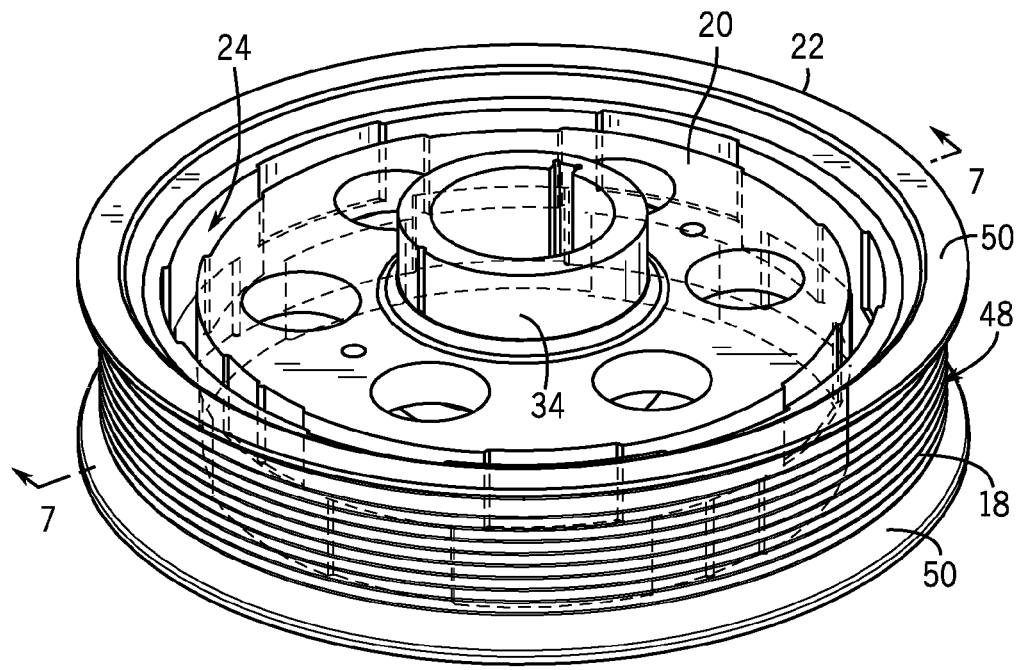
FIG. 6 is a perspective view of the powder metal parts of the assembly after the inner part has been placed inside the outer part, but before the formation of the intermediate dampening element.
Figure 7:
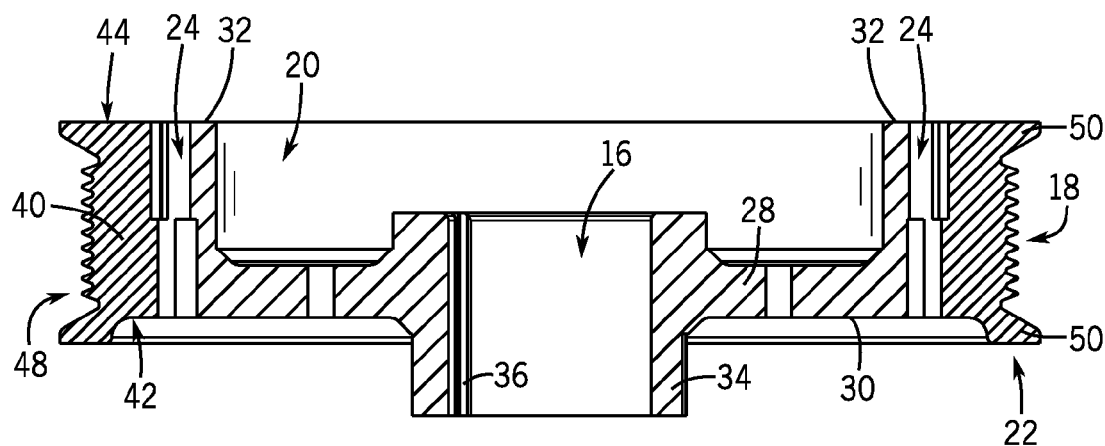
FIG. 7 is a side cross sectional view of FIG. 6 taken through line 7-7.

With particular reference to FIGS. 5 through 7, the assembly 10 includes a hub or powder metal inner part 20 and a ring or powder metal outer part 22. The powder metal inner part 20 (or hub) is centrally disposed in the powder metal outer part 22 (or ring) such that the powder metal inner part 20 and the powder metal outer part 22 are coaxial with one another along the axis A-A.

In an inter-part volume 24 between the powder metal inner part 20 and the powder metal outer part 22 (as best illustrated in FIGS. 6 and 7), an intermediate component 26 (as best illustrated in FIGS. 1 through 4) may be formed that bonds or connects the powder metal inner part 20 and the powder metal outer part 22 together. As will be described in more detail below with respect to the method of making the assembly 10, this intermediate component 26 may be formed in-place in the inter-part volume 24 between the powder metal inner part 20 and the powder metal outer part 22 by injecting an elastomeric material, such as rubber, into the inter-part volume 24 and then vulcanizing or curing this material to bond with the locking features of the powder metal parts 20 and 22 and thereby also form the intermediate component 26.

The powder metal inner part 20 is best shown apart from the assembly 10 in FIG. 5. The powder metal inner part 20 has a generally disc-shaped body 28 having a top side 30 and a bottom side 32 that oppose one another. This powder metal inner part 20 is formed from powder metal material that is compacted and then sintered to form a unitary body, albeit typically one with some amount of microporosity. The powder metal material could be any one of a number of materials depending on the particular end use, although for automotive applications, the material will typically be iron or an iron alloy.

On the center of the top side 30 of the powder metal inner part 20, there is a protrusion 34 that extends away from the disc-shaped portion of the body 28 of the powder metal inner part 20. The central opening 16 of the assembly 10 axially extends through the disc-like body 28 and protrusion 34. In the particular form shown, the central opening 16 is generally circular in profile, extends all the way through the powder metal inner part 20 along the axis A-A, and includes a keyway 36 formed in the sidewall of the central opening 16 for positive engagement with a key to transmit rotary motion imparted by a shaft. However, the central opening 16 need not take the particular form illustrated. Instead, for example, the central opening 16 could extend only part way through the powder metal inner part 20 (that is, not be a through hole) and/or be adapted for engagement with a shaft using some type of engagement other than a key, such as splines.

The disc-shaped body 28 also has an outer circumferential face 38 which has a plurality of alternating facets or locking features formed thereon. The specific configuration of these facets and their manner of formation will be described in more detail below after the powder metal outer part 22 (and its corresponding and complimentary features) has been initially described.

The powder metal outer part 22 or ring is also shown in greater detail in FIG. 5. The powder metal outer part 22 has a generally annular body 40 with a top axial side 42, a bottom axial side 44, an inner circumferential face 46, and an outer circumferential face 48. The top axial side 42 and the bottom axial side 44 are generally parallel with one another. The inner circumferential face 46 extends between the top axial side 42 and the bottom axial side 44 and has a plurality of alternating facets formed thereon. The outer circumferential face 48 also extends between the top axial side 42 and the bottom axial side 44 and has the belt track 18 formed therein between two flanges 50. Typically, the powder metal outer part 22 will be compacted in such a manner as to include the facets, but the belt track 18 will be machined into an otherwise initially cylindrical surface of the powder metal body.

It should be noted that the powder metal outer part 22 is also made by compacting and sintering a powder metal material into a unitary body. The specific powder metal material used to form the powder metal outer part 22 could be the same type of powder as the powder metal inner part 20 or could be a different powder metal material. For example, a different alloy might be selected based on the mechanical requirements of the features formed in the part or to permit further processing of the part (e.g., a comparatively easy to machine material may be selected for the powder metal outer part 22 in order to facilitate machining of the belt track 18).

With the powder metal inner part 20 and the powder metal outer part 22 having been generally described, the details of the facets and the manner in which they relate to the intermediate component 26 are now provided in more detail.

With particular reference to FIG. 5, on the outer circumferential face 38 of the disc-shaped body 28 of the powder metal inner part 20 and on the inner circumferential face 48 of the powder metal outer part 22, a plurality of facets are formed from plateaus 52 and recesses 54 in two annular rows which each extend around the outer circumferential face 38 and the inner circumferential face 46, respectively. As used herein, the term facet is used to an aspect or feature formed on a surface and could refer to either an aspect that is recessed relative to another surface or an aspect that plateaus relative to another surface. Accordingly, the plateaus 52 could be defined as the facets or the recesses 54 might be defined as the facets.

For the powder metal inner part 20, when the plateaus 52 are defined as the facets then the recesses 54 may be said to define a radially outward facing cylindrical surface of the powder metal inner part 20. In this instance, the plateaus 52 are displaced or offset radially outward from this cylindrical surface defined by the recesses 54. Moreover, as depicted in FIG. 4, the plateaus 52 may overlap one another to form a contiguous surface. If the recesses 54 are the facets for the powder metal inner part 20, then the plateaus 52 may be said to define a radially outward facing cylindrical surface of the powder metal inner part 20. In this instance, the recesses 54 are displaced or offset radially inward from this cylindrical surface defined by the plateaus 52.

For the powder metal outer part 22 when the plateaus 52 are defined as the facets, then the recesses 54 may be said to define a radially inward facing cylindrical surface of the powder metal outer part 22. In this instance, the plateaus 52 are displaced or offset radially inward from this cylindrical surface defined by the recesses 54. Again, the plateaus 52 may overlap one another to form a contiguous surface. If the recesses 54 are defined as the facets for the powder metal outer part 22, then the plateaus 52 may be said to define a radially inward facing cylindrical surface of the powder metal outer part 22. In this instance, the recesses 54 are displaced or offset radially outward from this cylindrical surface defined by the plateaus 52.

In either event, the facets are formed to extend from one of the opposing top and bottom sides 30 and 32 or 42 and 44 to a location on the radially outward or inward facing cylindrical surface between the two sides 30 and 32 or 42 and 44. In the particular form shown, this central location is an annular medial line that is halfway between the top and bottom sides 30 and 32 or 42 and 44; however, the end of the facet could occur in a location other than at a medial line.

To better define some of the structural features that define the facets in the illustrated embodiments, each facet may be said to include one or more side surfaces 56 that extends inward from one of the opposing axial sides 30 and 32 or 42 and 44 of the corresponding part 20 or 22 and an end surface 58 that is inwardly offset from one of the opposing axial sides 30 and 32 or 42 and 44 that is generally perpendicular to the one side surface(s) 56. For purposes of illustration, one of the facets in the form of a recess is illustrated in FIG.

5 for each of the parts 20 and 22. The one or more side surfaces 56 extends generally perpendicularly from one of the opposing axial sides 30 and 32 or 42 and 44 of the part 20 or 22, respectively and the two side surfaces 56 are disposed at opposing ends of the end surface 58. The side surfaces 56 can extend along a radial plane relative to the part 20 or 22 or may be angled relative thereto as depicted in FIG. 4. Likewise, the end surface 58 may lie in a plane perpendicular to the axis A-A of the part 20 or 22 or may be slightly angled with respect thereto.

Moreover, these facets are arranged in an alternating fashion about the circumferential surface. By alternating it is meant that, as one travels around the circumference of one of the powder metal inner part 20 or the powder metal outer part 22 that contains the facets, a first facet will be formed in either the top or bottom annular row, a second facet will be formed in the other annular row, a third facet will then be formed in the same annular row as the first facet, the fourth facet will be formed in the same annular row as the second facet, and so on. With this arrangement, the plurality of facets on the radially inward facing surface of the powder metal outer part 22 and the radially outward facing surface of the powder metal inner part 20 may be said to form a checkered pattern or placed along a grid.

It will be appreciated that other facets or features might be interposed between any two alternating facets and so unless otherwise specified in the claims, alternating should be construed to include arrangements other than merely a top row, bottom row, top row, bottom row type of arrangement. For example, as one travels around the circumferential surface, there could be two top row facets, two bottom row facets, two top row facets, two bottom row facets, and so on. As still another example, there could be splines which occasionally run the axial length from the top to the bottom of the circumferential surface between some or all of the alternating facets.

It should also be appreciated that while the plateaus 52 and recesses 54 are described as being cylindrical or partially cylindrical surfaces, that the facets may be formed to have non-cylindrical surfaces. For example, a recess and/or plateau may be flat or planar.

The specifics of the method of making the assembly 10 will now be described in more detail. The process begins with the compaction of powder metal material to form the precursor preforms of the powder metal inner part 20 and the powder metal outer part 22. After compaction, these powder metal preforms are then sintered to strongly bond the particles of powder metal material together to form a strong unitary body. Then, an material is injected between the powder metal inner part 20 and the powder metal outer part 22 and vulcanized or cured in order to form the intermediate component 26 which is elastomeric in the inter-volume space 24 and to bond the powder metal inner part 20 and the powder metal outer part 22 together. The sintered powder metal parts may also be subjected to some amount of machining, such as to form the belt track 18. This machining could potentially occur before or after the intermediate component 26 is formed.

Now with specific reference to FIGS. 8 through 11, the tool and die set 110 used to compact the preform 112 for the powder metal inner part 20 is illustrated. A tool and die set 110 of this type is typically received in a large hydraulic press machine which, although not illustrated, is capable of independently moving the various tool and die set 110 members relative to one another, so as to be able to apply pressure over the area of the tool members and compact any powder received therein together. The tools may also be received in other types of presses such as, for example, a mechanical press.

Figure 8:
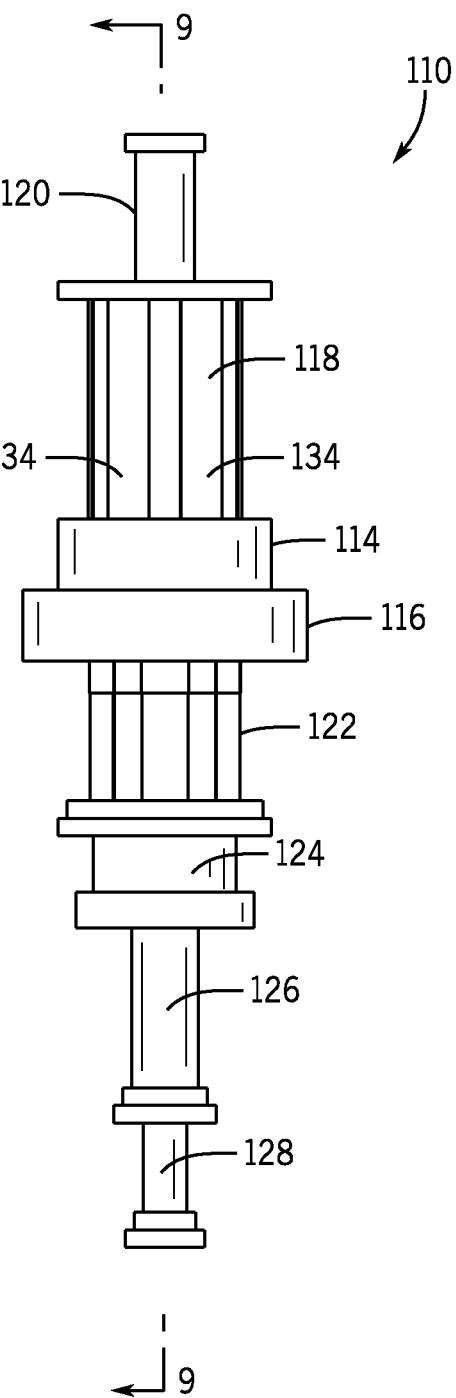
FIG. 8 is a side view of a closed tool and die set for forming the powder metal inner part.
Figure 9:
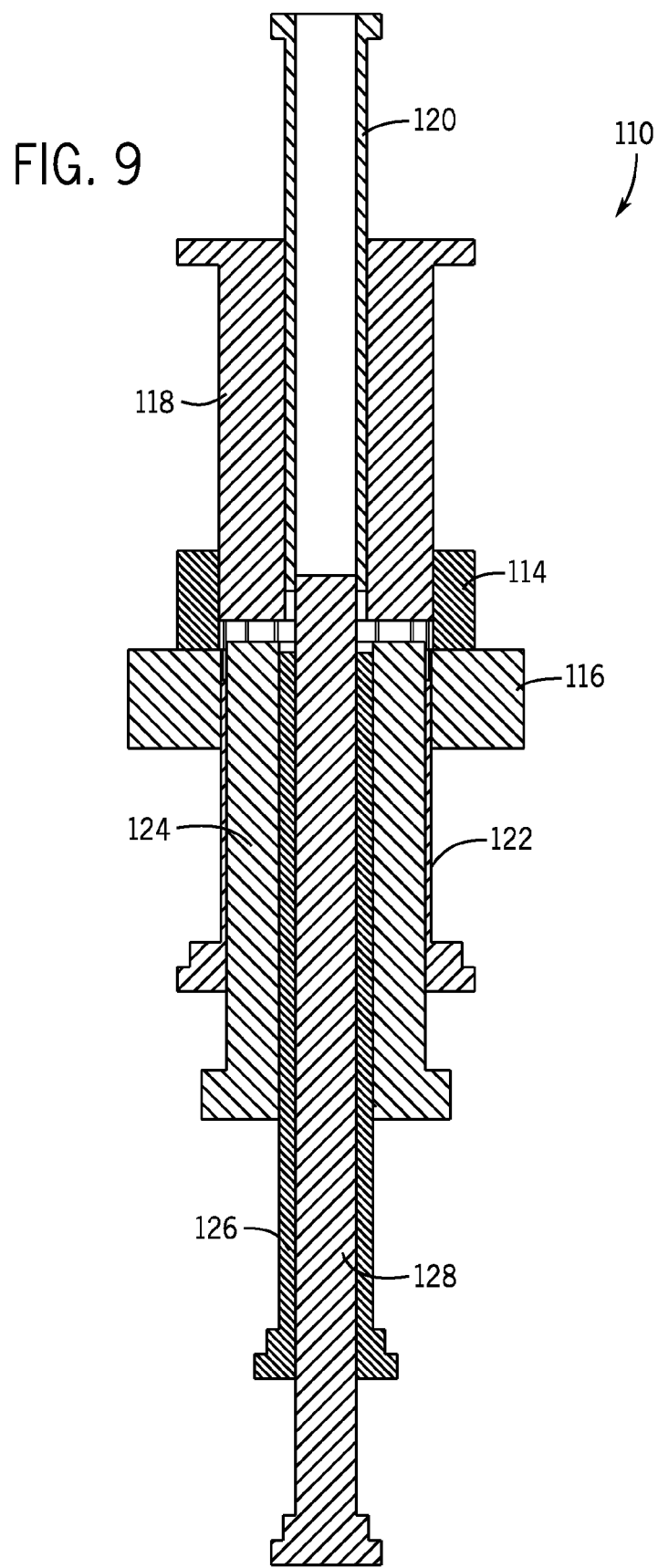
FIG. 9 is a cross sectional side view of the tool and die set taken along line 9-9 of FIG. 8 in which the tool and die set is in the compacted position.

As best seen in FIGS. 8 and 9, the tool and die set 110 includes a top die 114 and a bottom die 116 which can be closed by contacting an upper surface of the bottom die 116 against a lower surface of the top die 114. The tool and die set 110 has upper tool members including an upper outer punch 118 which is received in the top die 114 and an upper inner punch 120 which is received in the upper outer punch 118. As to the lower tool members of tool and die set 110, a lower outer punch 122 is upwardly received in the bottom die 116, a lower middle punch 124 is received in the lower outer punch 122, a lower inner punch 126 is received in the lower middle punch 124, and a lower core rod 128 received in the lower inner punch 126.

Because the various feature of the powder metal inner part 20 are generally circular or annular, this means that the various components of the tool and die set 110 are generally annular. So when it is stated that, for example, a first tooling member is received in a second tooling member, it is meant that the second tooling member has a generally circular or cylindrical opening through which the first member is inserted.

It should be appreciated that the radially inward and outward facing surfaces of some of these members have ridges or teeth that intermesh with other ridges or teeth on an adjacent member to form the facets. For example as labeled in FIG. 10, a radially inward facing surface 132 of the top die 114 and a radially outward facing surface 130 of the upper outer punch 118 can have intermeshing teeth or ridges (e.g., ridges 134 depicted in the non-cross sectional view of FIG. 8) formed thereon. The ridges or teeth on the radially inward facing surface 132 of the top die 114, along with the top surface of the bottom die 116 and the bottom surface of the upper outer punch 118, are used to form the top row of facets on the preform 112 of the powder metal inner part 20. A similar arrangement can be made using the dies and tools to form the bottom annular row of facets.

Figure 10:
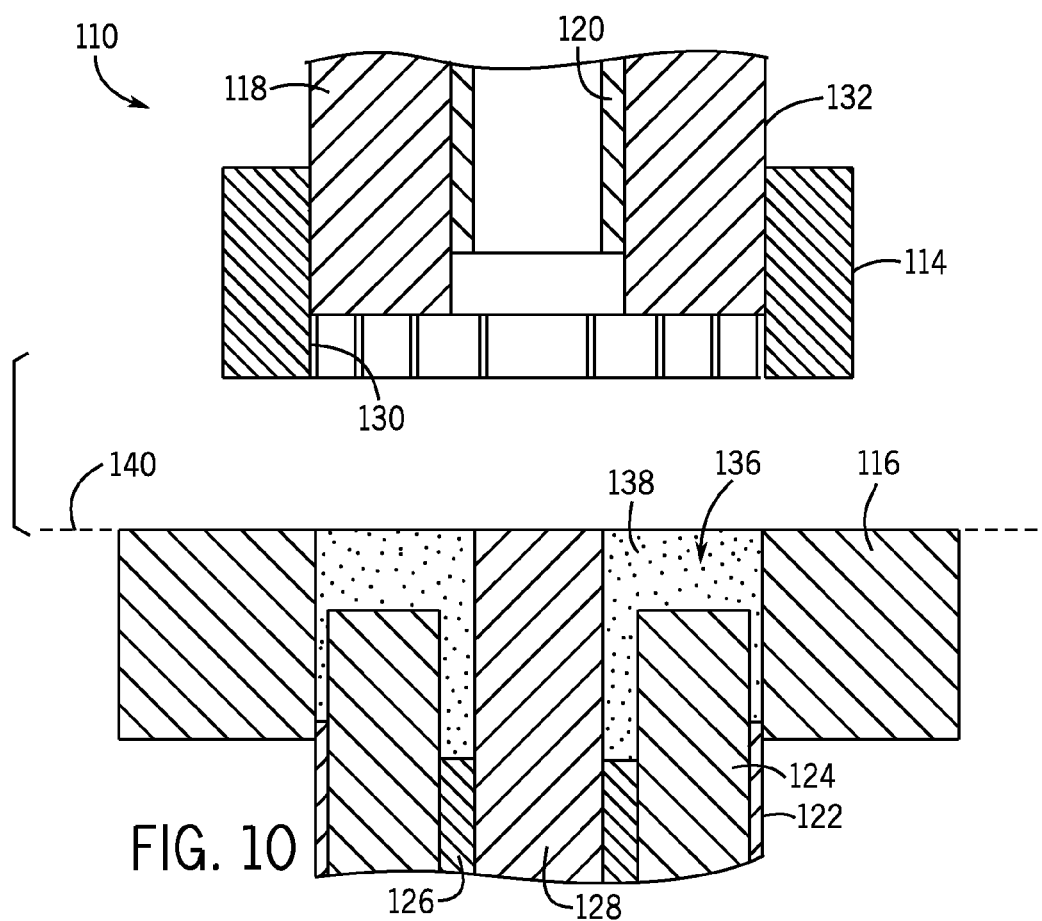
FIG. 10 is a detailed side cross sectional view of the tool and die set of FIG. 8 in which the tool and die set is in an open position and the cavity has been filled with powder metal material.

Turning now to the specific steps of compaction and with reference to FIG. 10, the tool and die set 110 is shown in an open position after a cavity 136 has been filled with an un-compacted powder metal material 138. In this open position, the top die 114, along with the upper outer punch 118 and the upper inner punch 120 have been lifted to create a space between those upper members and the lower members, so that a feedshoe can be inserted therebetween to fill the cavity 136 with the powder metal material 138.

In this position, it can be seen how the bottom die 116 various lower tooling members (e.g., items 122, 124, 126, and 128) define the walls of the cavity 136. Because the powder metal material 138 will be transferred upward in columns once the top die 114 and upper members are brought down, the lower tool members 122, 124, 126, 128 are shifted downward relative to the powder fill line 140 by a multiple of a powder compaction ratio (which is based on a comparison of the loose powder density to the compacted preform density) in order to achieve a desired thickness of the final part in the corresponding columnar region. It is noted that where there is an absence of powder metal in the final part, some tooling members (which in this instance includes the core rod 128) may be made flush with the powder fill line 140 and the top of the bottom die 216 to prevent any powder metal material from being received in the region(s) of powder absence.

After the cavity 136 is filled, then the top die 114 and the upper tool members 118 and 120 are moved downward until the top die 114 contacts the bottom die 116. Then (or concurrently with this motion) the core rod 128 can be moved upward to be received in a central channel or opening of the upper inner punch 120. When these two motions are complete, the cavity 136 is effectively sealed such that movement of the tool members toward one another can uniaxially compact of the powder metal material 136 to form the preform 126.

Figure 11:
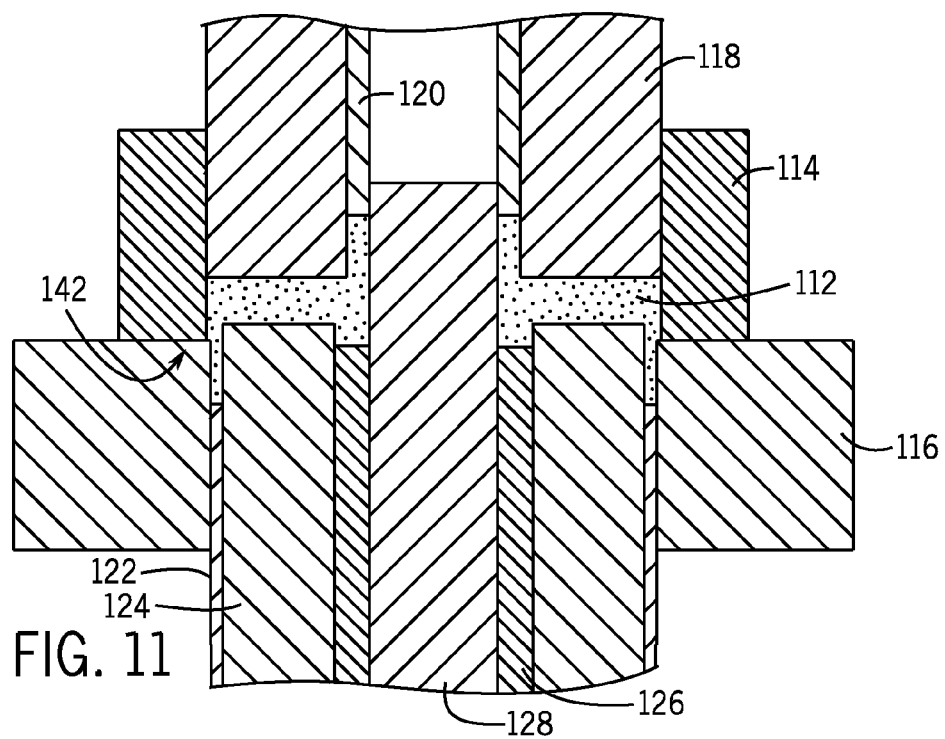
FIG. 11 is a detailed side cross sectional view of the tool and die set of FIG. 10 in which the tool and die set has been moved to a closed position and the powder metal material has been compacted into a preform.

The compacted position of the tool and die set 110 is illustrated in FIG. 11 in which the preform 112 has been compacted. In this position, the cavity 136 is shaped such that it generally corresponds to the shape of the powder metal inner part 20 (although some amount of shrinkage can occur during sintering, so the preform 112 is slightly larger than the powder metal inner part 20). The particular timing and movements of the tooling members and dies between FIG. 10 and FIG. 11 can be controlled to arrive at the final shape and ensure that powder metal material is received in the appropriate locations of the die.

It should be observed that the interface 142 between the upper die 114 and the bottom die 116 will establish the medial line between the two annular rows of facets in the embodiment depicted in the figures. This interface 142 is evidenced as a slight step between the top die 114 and the bottom die 116 in FIG. 11 which corresponds to an end surface of one of the facets in the formed part. Accordingly, this interface 142 should be so disposed relative to the other tool members so as to appropriately locate the features of the facets on the cylindrical face of the final powder metal part.

Once the preform 112 is compacted, the top die 114 and upper tool members 118 and 120 can be retracted such that the preform 112 can be ejected. Again, this usually requires some further timed movement of the tooling members to separate the walls of the preform 112 from the walls of the tooling without breaking any of the features, as preforms are relatively delicate before sintering. However, the specific movement of the tools and dies will not be described in further detail because one having ordinary skill in the art would be able to derive the steps from the arrangement of the tooling and shape of the preform 112 with little, if any, trial and error.

Figure 12:
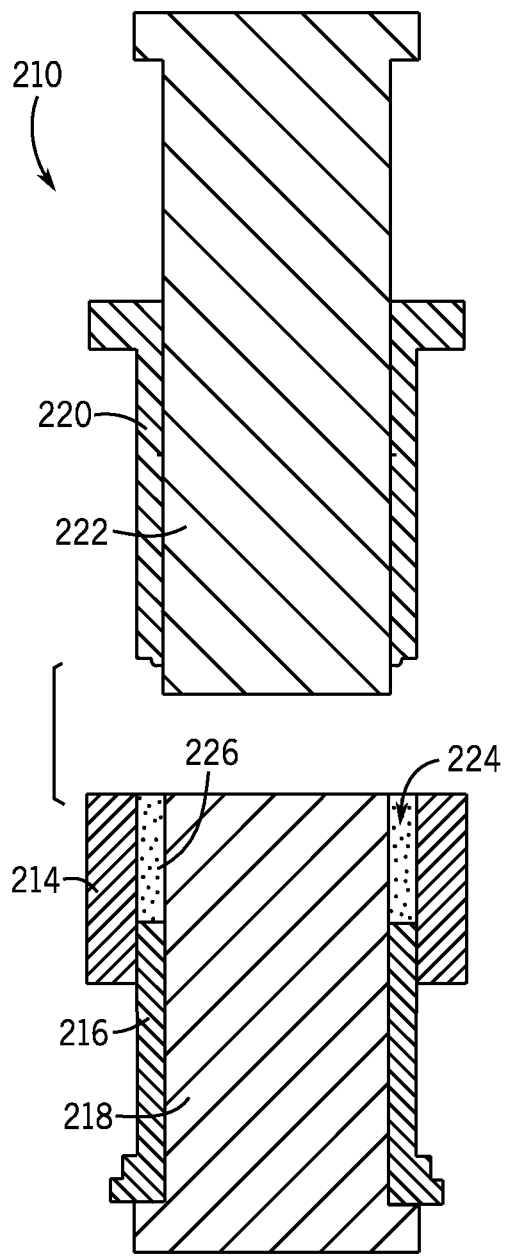
FIG. 12 is side cross sectional view of a tool and die set for forming powder metal material into the powder metal outer part of the assembly, in which the tool and die set is in an open position and the cavity has been filled with powder metal material.
Figure 13:
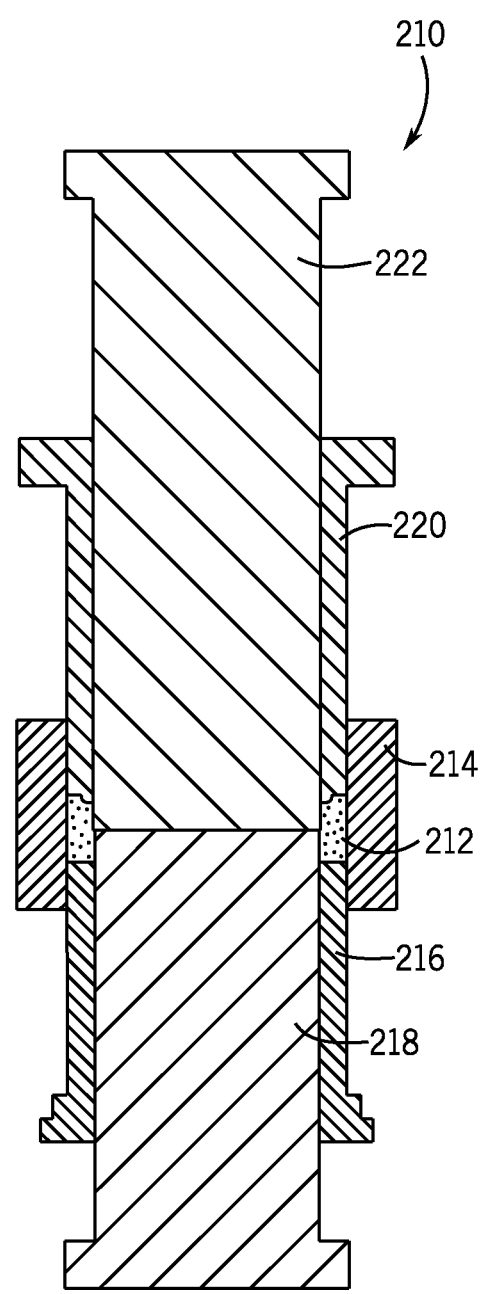
FIG. 13 is a side cross sectional view of the tool and die set of FIG. 12 in which the tool and die set has been moved to a closed position and the powder metal material has been compacted into a preform.

Now with general reference to FIGS. 12 and 13, a tool and die set 210 is shown for the compaction of a preform 212 that can be sintered and machined to form the powder metal outer part 22. Because of the geometry of the powder metal outer part 22, only a single annular die 214 is needed. In the die 214, a lower outer punch 216 is received; in the lower outer punch 216, a lower inner punch 218 is received. The upper tool members include an upper outer punch 220 and an upper inner punch 222.

Again, surfaces of certain members of the tool and die set 210 contain teeth or ridges to form the facets on the inner circumferential surface of preform 212 for the corresponding powder metal outer part 22. In this particular arrangement, the radially outwardly facing cylindrical surfaces of the upper inner punch 222 and the lower inner punch 218 have ridges or teeth formed thereon. To facilitate motion through of these inner punches 222 and 218 through the upper outer punch 220 and the lower outer punch 216, respectively, the radially inwardly facing cylindrical surfaces of the outer punches can have intermeshing features.

Looking now at FIG. 12, the tool and die set 210 is shown in an open position. In this position, the upper tooling members 220 and 222 have been lifted away from the die 214. The upper surface of the lower inner punch 218 has been lifted level to the upper surface of the die 214 and the lower outer punch 216 has been lowered (but is still within the die 214) in order to define a cavity 224. This cavity 224 is generally annularly shaped and is filled with the powder metal material 226 in a fill step when the tool and die set 210 is in this open position.

Then, the upper tooling members 220 and 222 are lowered to close the cavity 224. The lower surface of the upper inner punch 222 contacts the upper surface of the lower inner punch 218 to establish a powder free-central region and the upper outer punch 220 is received in the die 214 to close the top of the cavity 224.

Upon the subsequent application of pressure by movement of the tool members, the upper outer punch 220 and the lower outer punch 216 can be moved toward one another to compact the powder 226 to form the preform 212 for the powder metal outer part 22. It should be appreciated that, again, the powder metal 226 may be shifted within the closed cavity prior to any substantial compaction of the powder In the particular form shown, it will be appreciated that the interface between upper inner punch 222 and the lower inner punch 218 will define the medial line between the two annular rows of the facets. Accordingly, this interface should be disposed at an appropriate location relative to the outer tool members 216 and 220 and die 214 to form the facets.

Furthermore, at least as depicted, it should be appreciated that outer surface of the preform 212 is cylindrical. The belt track 18 can be machined in the preform after sintering.

Returning to the general description of the method, once the preforms 112 and 212 have been compacted, then they can be sintered and subsequently machined to form the powder metal inner part 20 and the powder metal outer part 22, respectively. Sintering times, temperatures, and atmospheres can vary by material and the particular geometry of the part being sintered.

Figure 1:
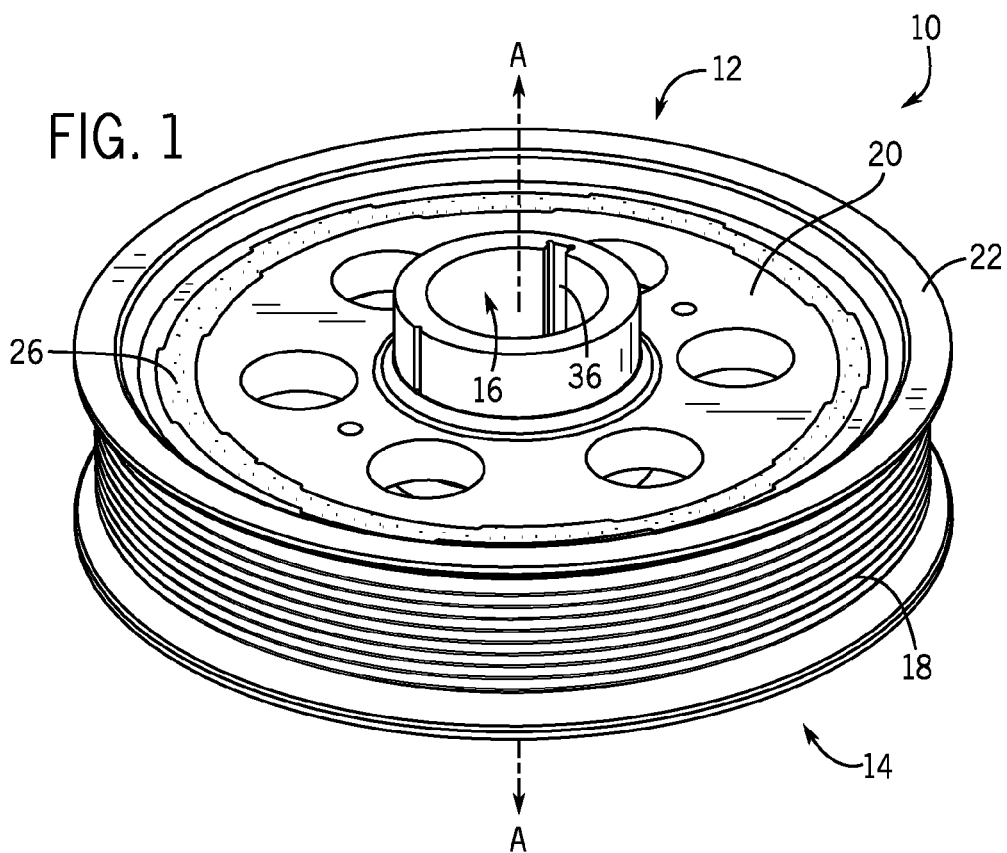
FIG. 1 is a top perspective view of an assembly used as a dampening mechanism.
Figure 2:
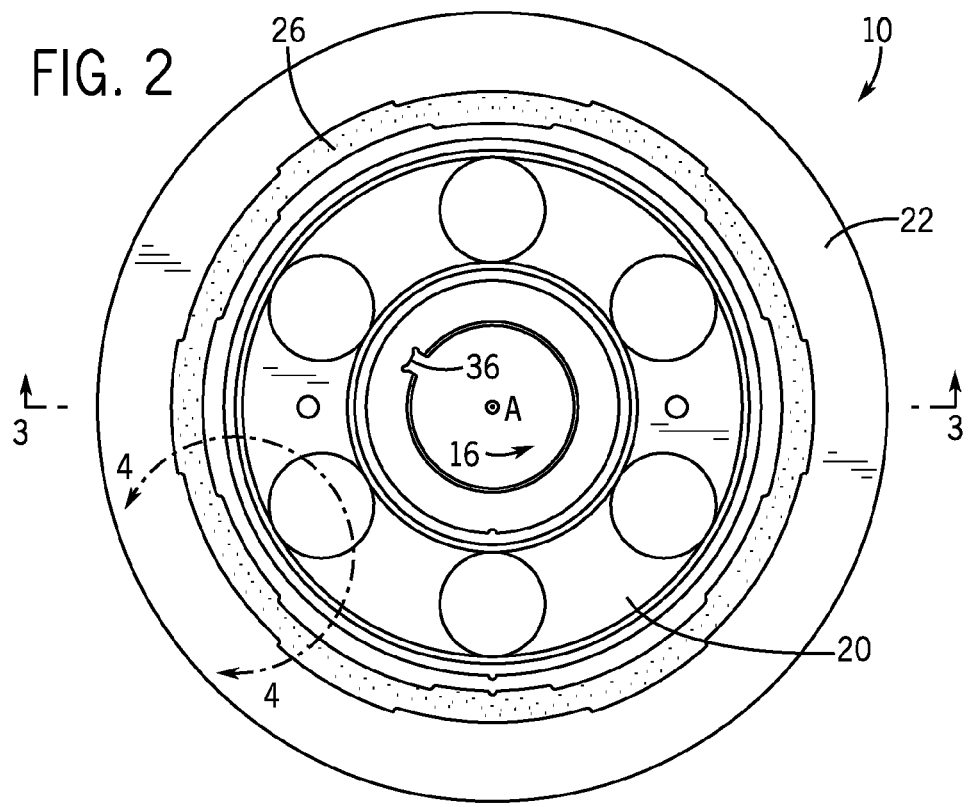
FIG. 2 is a top view of the assembly of FIG. 1.

After the parts 20 and 22 have been formed, then the powder metal inner part 20 is inserted into the powder metal outer part 22 as depicted, for example, in FIG. 5. In this example, the belt track 18 has been machined prior to assembly. Also, as illustrated in FIG. 2, the parts are positioned relative to one another with the recesses of the cylindrical surface of one part opposite from and on center with plateaus of the cylindrical surface of other part, with the plateaus larger in extent circumferentially than the opposed recesses so the plateaus overlap the recesses circumferentially.

At this point the elastomeric material can be injected between the powder metal inner part 20 and the powder metal outer part 20 (with a fixture, mold or the like forming the top and bottom walls) and vulcanized or cured to form the intermediate component 26.

With reference back to FIGS. 1 through 4, when the intermediate component 26 is molded between the powder metal parts 20 and 22, it bonds to the faceted surfaces of the powder metal parts 20 and 22. A radially inward facing surface of the intermediate component 26 bonds to the radially outward facing surface of the powder metal inner part 20 and a radially outward facing surface of the intermediate component 26 bonds to the radially inward facing surface of the powder metal outer part 22. Accordingly, a surface profile on the radially inward facing surface of the intermediate component 26 generally inversely corresponds with the surface profile of the radially outward facing surface of the powder metal inner part 20. Likewise, a surface profile on the radially outward facing surface of the intermediate component 26 generally inversely corresponds with the surface profile of the radially inward facing surface of the powder metal outer part 22. Under certain conditions, the material of the intermediate component 26 may infiltrate the surfaces to which it bonds, as these surfaces can have microporosity.

In this way, an intermediate dampening component can be placed between two powder metal parts to form a dampening pulley. Because of the manner in which the facets are formed, the dampening element is inhibited from movement in both the axial and angular directions relative to the powder metal parts although, because of its function, the volume of the intermediate component is able to deform to at least some degree in order to dampen noise and vibrations.

While formation of an assembly for dampening motion has been described in the context of a damper pulley assembly, it is contemplated that the dampening arrangement with alternating facets engaging an intermediate dampening material might be used in other types of couplings and assemblies. For example, this type of design could be applied to a shock-proof gear or any number of other rotary assemblies.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. An assembly comprising:
a powder metal outer part having a radially inward facing cylindrical surface with a plurality of facets formed thereon that, in an alternating fashion, extend in an axial direction from an axial side of the powder metal outer part toward an opposite axial side of the powder metal outer part to a position between the opposing axial sides of the powder metal outer part;
a powder metal inner part having a radially outward facing cylindrical surface with a plurality of facets formed thereon that, in an alternating fashion, extend in an axial direction from an axial side of the powder metal inner part toward an opposite axial side of the powder metal inner part to a position between the opposing axial sides of the powder metal inner part; and
an intermediate component disposed between the cylindrical surfaces of the powder metal outer part and the powder metal inner part that connects the powder metal outer part and the powder metal inner part together;
wherein each of the plurality of facets of the powder metal outer part terminate at the position between the opposing axial sides of the powder metal outer part and wherein each of the plurality of facets of the powder metal inner part terminate at the position between the opposing axial sides of the powder metal inner part.

2. The assembly of claim 1 wherein the intermediate component comprises a radially inward facing surface that bonds to the radially outward facing cylindrical surface of the powder metal inner part and further comprises a radially outward facing surface that bonds to the radially inward facing cylindrical surface of the powder metal outer part.

3. The assembly of claim 2 wherein the intermediate component comprises:
a surface profile on the radially inward facing surface that generally inversely corresponds with a surface profile of the radially outward facing cylindrical surface of the powder metal inner part; and
a surface profile on the radially outward facing surface that generally inversely corresponds with a surface profile of the radially inward facing cylindrical surface of the powder metal outer part.

4. The assembly of claim 1 wherein the intermediate component comprises an elastomeric material.

5. The assembly of claim 1 wherein the plurality of facets on the radially inward facing cylindrical surface of the powder metal outer part and the radially outward facing cylindrical surface of the powder metal inner part form a checkered pattern.

6. The assembly of claim 1 wherein, once the intermediate component is disposed between the powder metal inner part and the powder metal outer part to connect them together, the facets inhibit movement of the intermediate component in both an axial direction and in an angular direction relative to the powder metal inner part and the powder metal outer part.

7. The assembly of claim 1 wherein the assembly is a damper pulley for use with an automotive internal combustion engine.

8. The assembly of claim 1 wherein the facets are recesses.

9. The assembly of claim 1 wherein the facets are plateaus.

10. The assembly of claim 1 wherein each of the facets are radially offset cylindrical surfaces from the corresponding cylindrical surface on which the facets are formed.

11. The assembly of claim 1 wherein the powder metal outer part has a radially outward facing surface having a track formed therein for reception of a drive belt.

12. The assembly of claim 1 wherein the facets are arranged into annular rows and the powder metal inner part and the powder metal outer part each have two annular rows of the facets.

13. The assembly of claim 1 wherein each facet includes at least one side surface that extends inward from one of the opposing axial sides of the part and at least one end surface that is inwardly offset from one of the opposing axial sides that is generally perpendicular to the at least one side surface.

14. The assembly of claim 13 wherein the end surface lies in a plane perpendicular to the axis of the part.

15. The assembly of claim 1 wherein the facets form a grid and adjacent facets overlap one another.

16. The assembly of claim 1 wherein the facets are formed by a pattern of recesses and plateaus on the cylindrical surfaces of the inner and outer parts, and recesses of one of the cylindrical surfaces are opposite from plateaus of the other cylindrical surface.

17. The assembly of claim 16, wherein the plateaus extend further circumferentially than the recesses.

18. The assembly of claim 17, wherein the plateaus of one of the cylindrical surfaces circumferentially overlap the recesses of the other cylindrical surface.

19. The assembly of claim 18, wherein the plateaus of one of the cylindrical surfaces are centered with respect to the recesses of the other cylindrical surface.

20. A method of making an assembly comprising:
compacting a first preform from powder metal and sintering the first preform to form a powder metal outer part, the powder metal outer part having a radially inward facing cylindrical surface with a plurality of facets formed thereon that, in an alternating fashion, extend in an axial direction from one of the opposing axial sides of the first preform to a position therebetween;
compacting a second preform from powder metal and sintering the second preform to form a powder metal inner part, the powder metal inner part having a radially outward facing cylindrical surface with a plurality of facets formed thereon that, in an alternating fashion, extend in an axial direction from one of the opposing axial sides of the second preform to a position therebetween; and connecting the powder metal outer part and the powder metal inner part together using an intermediate component; the intermediate component disposed between the cylindrical surfaces of the powder metal outer part and the powder metal inner part;

wherein each of the plurality of facets of the powder metal outer part terminate at the position between the opposing axial sides of the powder metal outer part and wherein each of the plurality of facets of the powder metal inner part terminate at the position between the opposing axial sides of the powder metal inner part.

* * * * *